United States Patent Office 2,823,224
Patented Feb. 11, 1958

2,823,224

HALOARYLOXYALKYL ESTERS OF α,α-DICHLOROBUTYRIC ACID

Herman O. Senkbeil, Charles T. Pumpelly, and Harry F. Brust, Midland, Mich., assignors to The Dow Chemical Company, Midland, Mich., a corporation of Delaware No Drawing. Application July 2, 1956
Serial No. 595,070

6 Claims. (Cl. 260—487)

This invention relates to the haloaryloxyalkyl esters of α,α-dichlorobutyric acid. These compounds are crystalline solids or viscous liquids somewhat soluble in many organic solvents and only slightly soluble in water. They have been found to be active as plant growth control materials and soil sterilants and are adapted to be employed as active toxic constituents in dust and liquid compositions for the control of the growth and the killing of weeds and for the sterilization of soil with regard to the growth of plants. The compounds are also useful as parasiticides for the control of many insect and bacterial organisms such as Rhizoctonia solani.

The compounds may be prepared by reacting α,α-dichlorobutyric acid with a haloaryloxyloweralkanol. The reaction may be carried out in the presence of an esterification catalyst such as sulfuric acid, phenol sulfonic acid or a cation exchange resin in the acid form, and conveniently in a water-immiscible solvent such as ethylene dichloride, monochlorobenzene or toluene. The amount of reactants employed is not critical since some of the desired ester product is produced with any proportion of reagents. However, good results are obtained when substantially equimolecular proportions of the reactants are employed. The employment of an excess of the alkanol coupled with the continuous removal of the water of reaction as formed generally results in optimum yields.

In carrying out the reaction, the α,α-dichlorobutyric acid, haloaryloxyalkanol and catalyst, if employed, are mixed and the resulting mixture heated at a temperature of from 75° to 180° C. for a sufficient period of time to complete the reaction. In an alternative procedure, the reactants and catalyst, if employed, are dispersed in the solvent and the resulting mixture heated at the boiling temperature. During the heating period, the water of reaction and some of the solvent are continuously removed by distillation, condensed and the solvent recovered. More solvent may be added to the reaction mixture if necessary.

Upon completion of the reaction, the desired product may be separated by fractional distillation under reduced pressure. If the product is a solid and precipitates from the cooled reaction mixture before or after removal of the reaction solvent, it may be separated by filtration and purified by recrystallization from various organic solvents. In another method of separation, the solvent mixture of the reaction product is neutralized with an alkali such as dilute aqueous sodium carbonate. The reaction mixture divides into aqueous and solvent layers which may be separated by decantation. The solvent layer containing the ester reaction product is washed several times with water and then fractionally distilled under reduced pressure to obtain the desired ester compound.

The following examples illustrate the invention but are not to be construed as limitations thereof:

Example 1.—2-(2,4,5-trichlorophenoxy)-ethyl
α,α-dichlorobutyrate

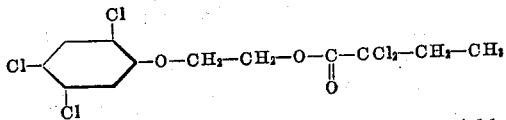

130.75 grams (0.54 mole) of 2-(2,4,5-trichlorophenoxy)-ethanol (melting at 66.5°–68.5° C.) and 93.5 grams (0.60 mole) of α,α-dichlorobutyric acid were mixed with 200 milliliters of ethylene dichloride and the resulting mixture heated for 49 hours at a temperature of from 105° to 126° C. The heating was carried out with continuous distillation of water of reaction and some of the ethylene dichloride, separation of the water and recycling of the ethylene dichloride. Upon completion of the esterification, the reaction mixture was washed with water and fractionally distilled under reduced pressure to separate a 2-(2,4,5-trichlorophenoxy)-ethyl α,α-dichlorobutyrate product boiling at 152°–153° C. at 1 millimeter pressure. This product crystallized upon cooling and was recrystallized from ethanol. The recrystallized product melted at 62°–63° C. and had a chlorine content of 45.4 percent as compared to a theoretical content of 46.6 percent.

Example 2.—2-(2,4,5-trichlorophenoxy)-1-propyl
α,α-dichlorobutyrate

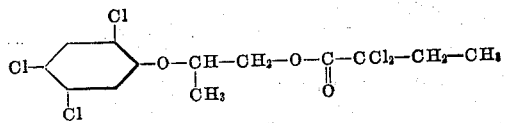

A mixture of 127.7 grams (0.5 mole) of 2-(2,4,5-trichlorophenoxy)-1-propanol (boiling at 130°–131° C. at 1 millimeter pressure), 82.4 grams (0.52 mole) of α,α-dichlorobutyric acid and 0.5 milliliter of concentrated sulfuric acid was dispersed in 200 milliliters of ethylene dichloride. The resulting mixture was heated for 17 hours at a temperature of 100° C. while the water of reaction was continuously distilled along with some of the ethylene dichloride from the reaction zone. Upon completion of the reaction, the mixture was washed with water and partially distilled under reduced pressure to remove the ethylene dichloride. There was obtained as a viscous liquid residue a 2-(2,4,5-trichlorophenoxy)-1-propyl α,α-dichlorobutyrate product having a saponification equivalent of 400 and a chlorine content of 44.8 percent as compared to the theoretical value of 44.9 percent.

Example 3.—2-(3,4-dichlorophenoxy)-ethyl
α,α-dichlorobutyrate

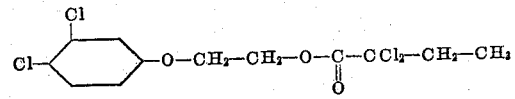

87 grams (0.55 mole) of α,α-dichlorobutyric acid, 104 grams (0.5 mole) of 2-(3,4-dichlorophenoxy)-ethanol (having a refractive index n/D of 1.5494 at 25° C.) and 0.5 milliliter of concentrated sulfuric acid were dispersed in 200 milliliters of ethylene dichloride and the resulting mixture heated for 20 hours at the boiling temperature. The heating was carried out in the usual fashion with continuous distillation of some of the ethylene dichloride and water of reaction was formed. Upon completion of the reaction, the reaction mixture was washed with water and the ethylene dichloride removed by distillation at atmospheric pressure. The residue was thereafter fractionally distilled under reduced pressure to separate a 2-(3,4-dichlorophenoxy)-ethyl α,α-dichlorobutyrate product as a viscous liquid boiling at 140°–143° C. at 0.5 millimeter pressure and having a chlorine content of 40.3 percent as compared to the calculated value of 41.0 percent.

*Example 4.—1-(3,4-dichlorophenoxy)-2-pyropyl α,α-dichlorobutyrate*

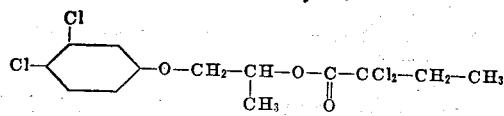

A mixture of 44.2 grams (0.2 mole) of 1-(3,4-dichlorophenoxy)-2-propanol (having a molecular weight of 233) and 34.5 grams (0.22 mole) of α,α-dichlorobutyric acid was dispersed in 150 milliliters of ethylene dichloride and the resulting mixture heated for 20 hours at a temperature of from 105° to 111° C. The water of reaction was continuously removed as formed along with some of the ethylene dichloride in the previously described manner. About 1 milliliter of concentrated sulfuric acid was then added as a catalyst and heating continued under the same conditions for another 20 hours. The reaction mixture was then washed several times with water and fractionally distilled under reduced pressure to separate a 1-(3,4-dichlorophenoxy)-2-propyl α,α-dichlorobutyrate product. This product was a viscous liquid boiling at 146°–150° C. at 0.1 millimeter pressure.

*Example 5.—2-(4-chloro-2-methylphenoxy)-ethyl α,α-dichlorobutyrate*

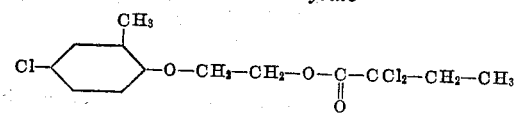

One mole of 2-(4-chloro-2-methylphenoxy)-ethanol (melting at 51°–55° C.), one mole of α,α-dichlorobutyric acid and 1 milliliter of phenol sulfonic acid are dissolved in 400 milliliters of ethylene dichloride and the resulting mixture heated at the boiling temperature for 20 hours. The reaction mixture is then fractionally distilled under reduced pressure to separate the desired ester product as a viscous liquid having a molecular weight of 330.

*Example 6.—1-(pentachlorophenoxy)-2-propyl α,α-dichlorobutyrate*

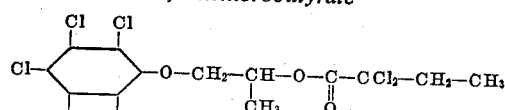

A mixture containing one mole quantities of (pentachlorophenoxy)-2-propanol (melting at 64°–66° C.) and α,α-dichlorobutyric acid and 1 milliliter of sulfuric acid in 150 milliliters of ethylene dichloride is heated for 22 hours in the usual manner while continuously removing a mixture of ethylene dichloride and water of reaction as formed. The reaction mixture is then fractionally distilled to separate the desired ester product which has a molecular weight of 400.

*Example 7.—2-(4-bromophenoxy)-ethyl α,α-dichlorobutyrate*

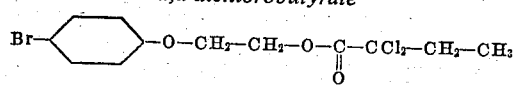

0.75 mole of 2-(4-bromophenoxy)-ethanol (melting at 51°–55° C.) and 0.78 mole of α,α-dichlorobutyric acid are dispersed in 200 milliliters of ethylene dichloride and the resulting mixture heated at about 110° C. for 50 hours. The heating is carried out with continuous distillation of the water of reaction and entraining agent as previously described. Following the heating period, the mixture is washed with water and fractionally distilled under reduced pressure to separate a 2-(4-bromophenoxy)-ethyl α,α-dichlorobutyrate product having a molecular weight of 290.

In a similar manner, other haloaryloxyalkyl α,α-dichlorobutyrates may be prepared as follows:

2-(2-bromo-4-chlorophenoxy)-ethyl α,α-dichlorobutyrate by the reaction of α,α-dichlorobutyric acid and 2-(2-bromo-4-chlorophenoxy)-ethanol.

2-(2,4-dibromophenoxy)-ethyl α,α-dichlorobutyrate by the reaction of α,α-dichlorobutyric acid and 2-(2,4-dibromophenoxy)-ethanol.

2-(4-chlorophenoxy)-ethyl α,α-dichlorobutyrate by the reaction of α,α-dichlorobutyric acid and 2-(4-chlorophenoxy)-ethanol.

3-(2,4-dichlorophenoxy)-1-butyl α,α-dichlorobutyrate by the reaction of α,α-dichlorobutyric acid and 3-(2,4-dichlorophenoxy)-1-butanol.

3-(4-chlorophenoxy)-1-propyl α,α-dichlorobutyrate by the reaction of α,α-dichlorobutyric acid and 3-(4-chlorophenoxy)-1-propanol.

The new α,α-dichlorobutyric acid esters are useful as parasiticides and herbicides and are particularly valuable for the eradication of grasses such as Johnson grass and Canary grass. The compounds are very persistent in soil and are adapted to be employed to control the growth of seed emerging seedlings and established plants over a prolonged period of time. For such use the products may be dispersed on an inert finely divided solid and employed as dusts. They may also be dispersed in water with the aid of a wetting agent and the resulting mixture employed as a spray. If desired, the products may be employed as constituents of oil-in-water emulsions or water dispersions with or without the addition of surface active agents. In representative operations, 100 percent controls of Canary grass have been obtained with foliar applications of aqueous compositions containing 500 parts by weight of 2-(2,4,5-trichlorophenoxy)-1-propyl α,α-dichlorobutyrate per million parts by weight of ultimate mixture.

The haloaryloxyalkanols employed as starting materials are conveniently prepared by reacting an alkali metal salt of an appropriate phenol with a monohaloaliphatic alcohol such as ethylene chlorohydrin, propylene chlorohydrin, 2-chloro-1-propanol, 3-bromo-1-propanol, 3-chloro-1-propanol, 3-chloro-2-propanol and 3-chloro-1-butanol.

We claim:

1. An α,α-dichlorobutyrate of a haloaryloxyloweralkanol selected from the group consisting of bromophenoxyloweralkanols, bromotolyloxyloweralkanols, chlorophenoxyloweralkanols and chlorotolyloxyloweralkanols.

2. An α,α-dichlorobutyrate of a haloaryloxyethanol selected from the group consisting of bromophenoxyethanol, bromotolyloxyethanol, chlorophenoxyethanol and chlorotolyloxyethanol.

3. 2-(2,4,5-trichlorophenoxy)-ethyl α,α-dichlorobutyrate.

4. 2-(2,4,5-trichlorophenoxy)-1-propyl α,α-dichlorobutyrate.

5. 2-(3,4-dichlorophenoxy)-ethyl α,α-dichlorobutyrate.

6. 1-(3,4-dichlorophenoxy)-2-propyl α,α-dichlorobutyrate.

References Cited in the file of this patent

UNITED STATES PATENTS

| | | |
|---|---|---|
| 2,693,407 | Swezey | Nov. 2, 1954 |
| 2,754,324 | Brust et al. | July 10, 1956 |
| 2,765,224 | Lambrech | Oct. 2, 1956 |